United States Patent
George

(10) Patent No.: US 6,750,921 B1
(45) Date of Patent: Jun. 15, 2004

(54) PROJECTION VIDEO DISPLAY WITH PHOTO TRANSISTOR SENSORS

(75) Inventor: John Barrett George, Carmel, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/538,567

(22) Filed: Mar. 29, 2000

Related U.S. Application Data

(60) Provisional application No. 60/141,628, filed on Jun. 30, 1999.

(51) Int. Cl.$^7$ .......................... H04N 3/22; H04N 3/223; H04N 3/26
(52) U.S. Cl. .................. 348/745; 348/747; 348/806
(58) Field of Search ........................... 348/745, 746, 348/747, 806, 807, 511; 382/286; H04N 9/28, 3/22, 3/26, 3/23, 3/223, 3/227

(56) References Cited

U.S. PATENT DOCUMENTS

| | | | | |
|---|---|---|---|---|
| 5,883,476 A | | 3/1999 | Noguchi et al. ............. | 315/368 |
| 6,333,768 B1 | * | 12/2001 | Kawashima et al. ......... | 348/806 |

FOREIGN PATENT DOCUMENTS

| | | | |
|---|---|---|---|
| DE | 3311971 | 10/1984 | ............ H04N/5/74 |
| EP | 0420568 | 4/1991 | ............ H04N/9/28 |
| EP | 0555094 | 8/1993 | ............ H04N/9/29 |
| EP | 0703714 | 3/1996 | ............ H04N/9/28 |
| JP | 7-184222 | 12/1993 | |
| JP | 7-184222 | 7/1995 | ............ H04N/9/28 |
| JP | 7-336701 | 12/1995 | ............ H04N/9/28 |
| JP | 7-336708 | 12/1995 | ............ H04N/9/28 |
| JP | 9-37277 | 2/1997 | ............ H04N/9/28 |

OTHER PUBLICATIONS

Shiomi, Makoto et al: "A Fully Digital Convergence System for Projection TV", IEEE Transactions on Consumer Electronics, vol. 36 No. 3, Aug. 1990, S. 445–453.
Buttar, A et al. "A High Performance Digital Convergence and Focus System for Projection TV", IEEE Tranactions on Consumer Electronics vol. 38, No. 3, Aug. 1992, S–734–740.
Hitachi Service Manual, AP73/74 Chassis, Jul. 1997, Projection Color Television.
U.S. Appln. Ser. No. 08/990,935 (RCA 88830), Method for Adjusting the Convergence in a Projection Television Receiver, filed Dec. 15, 1997.
U.S. Appln. Ser. No. 09/007,986 (RCA 88847), Circuit For Convergence Setting in a Projection Television Set, filed Jan. 16, 1998.
U.S. Appln. Ser. No. 09/343,730 (RCA 89556), Automated Calibration in a Projection Display Apparatus, filed Jun. 30, 1999.
U.S. Appln. Ser. No. 09/343,731 (RCA 89557), Projection Video Display for Multiple Signal Sources, filed Jun. 30, 1999.
U.S. Appln. Ser. No. 09/345,087 (RCA 89558), OPTO Sensor Signal Detector, filed Jun. 30, 1999.
U.S. Appln. Ser. No. 09/343,752 (RCA 89559), OPTO Sensor Signal Current Detector, filed Jun. 30, 1999.
U.S. Appln. Ser. No. 09/343,753 (RCA 89560), Projection Video Display with Multiple Photo Sensors, filed Jun. 30, 1999.

* cited by examiner

Primary Examiner—Sherrie Hsia
(74) Attorney, Agent, or Firm—Joseph S. Tripoli; Harvey D. Fried; Francis A. Davenport

(57) ABSTRACT

A method for determining raster positioning in a video projection display apparatus comprises the steps of detecting illumination by a first edge of a measurement image moving in a first direction. Detecting illumination by a second edge of the measurement image moving in a second direction, and averaging movement values related to the first and second edge illuminations of the detecting steps.

11 Claims, 2 Drawing Sheets

PROJECTION VIDEO DISPLAY WITH PHOTO TRANSISTOR SENSORS

CROSS REFERENCE TO RELATED APPLICATIONS

This is a non-provisional application of application No. 60/141,628 filed Jun. 30, 1999.

FIELD OF THE INVENTION

This invention relates to the field of video projection display and in particular to the use of a photo transistor for measurement of projected illumination.

BACKGROUND OF THE INVENTION

In a projection video display, geometrical raster distortions result from the physical placement of the cathode ray display tubes. Such raster distortions are exacerbated by the use of cathode ray tubes with curved, concave display surfaces and the inherent magnification in the optical projection path. The projected image is composed of three scanning rasters which are required to be in register one with the other on a viewing screen. The precise overlay of the three projected images requires the adjustment of multiple waveforms to compensate for geometrical distortion and facilitate the superimposition of the three projected images. However, manual alignment of multiple waveforms is labor intensive during manufacturing, and without the use of sophisticated test equipment may preclude setup at a user location. Thus an automated convergence system is disclosed which simplifies manufacturing alignment and facilitates user location adjustment. An automated alignment system may employ raster edge measurement at peripheral display screen locations in order to determine raster size and convergence. Such raster edge measurement may be facilitated with a plurality of photo transistors.

SUMMARY OF THE INVENTION

A projection television display apparatus with an automated alignment system may advantageously employ raster edge measurement at peripheral display screen locations with a plurality of photo transistors. A method for determining raster positioning in a video projection display apparatus comprises the steps of detecting illumination by a first edge of a measurement image moving in a first direction. Detecting illumination by a second edge of the measurement image moving in a second direction, and averaging movement values related to the first and second edge illuminations of the detecting steps.

In a parallel sensor arrangement differences in image edge determination are advantageously precluded by sensing and detecting marker image edges with a marker that reverses sensing direction. In simple terms, motion direction of the marker block image is reversed relative to the sensor, which consequently reverses the leading and trailing marker image edges. Thus dissimilar edge determination is precluded. In more general terms, edge dissimilarities are obviated and accurate image edge sensing is obtained when image edges cause the sensor to transition from an unlit to lit condition.

DETAILED DESCRIPTION

Figure 1:
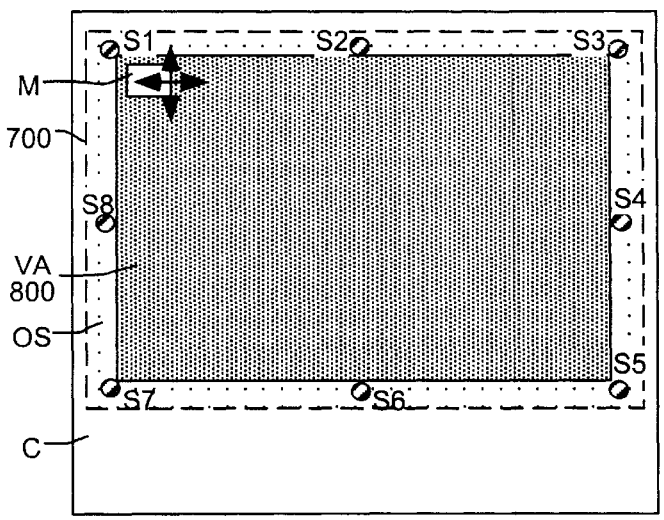
FIG. 1 is a simplified front view of a projection video display.

FIG. 1 illustrates a front view of a video projection display apparatus. The projection display comprises a plurality of cathode ray tubes with raster scanned images which are projected on to screen 700. A cabinet supports and surrounds screen 700 and provides a picture display area 800 which is slightly smaller than the screen. Screen 700 is depicted with a broken line to indicate an edge area which is concealed within cabinet C and which may be illuminated with raster scanned images when operated in an overscan mode as indicated by area OS. Photo transistor sensors are located adjacent to the periphery of screen 700 within the concealed edge area and outside viewed area 800. Eight photo transistor sensors, depicted as shaded circles, are shown in FIG. 1, positioned at the corners and at the centers of the screen edges. Thus with these sensor positions it is possible to detect and measure an image formed by an electronically generated test pattern, for example a non-peak video value block M. By sensing illumination of sensor S by block M determination of picture width and height and certain geometric errors, for example, rotation, bow, trapezium, pincushion etc. is achieved. Hence the displayed images are aligned to be superimposed one with the other over the whole of the screen area. Measurements are performed in both horizontal and vertical directions in each of the three projected color images thus yielding at least forty eight measured values.

Figure 2:
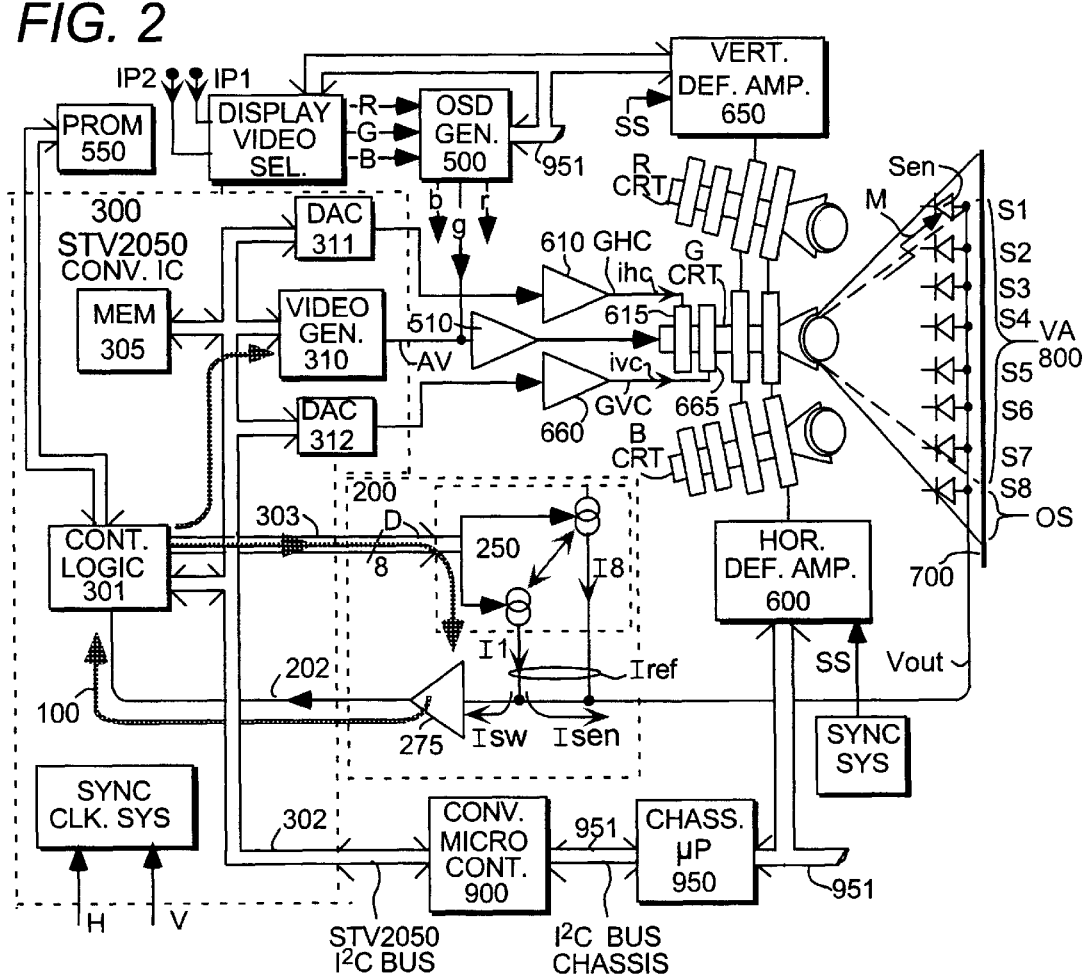
FIG. 2 is a simplified block diagram of a video image projection display apparatus including inventive features.

Operation of the measurement and alignment system will be explained with reference to FIG. 2 which depicts in block diagram form, part of a raster scanned video projection display. In FIG. 2 three cathode ray tubes, R, G and B form raster scanned monochromatic color images which are directed through individual lens systems to converge and form a single display image 800 on screen 700. Each cathode ray tube is depicted with four coil sets which provide horizontal and vertical deflection and horizontal and vertical convergence. The horizontal deflection coil sets are driven by a horizontal deflection amplifier 600 and vertical deflection coil sets are driven by a vertical deflection amplifier 650. Both horizontal and vertical deflection amplifiers are driven with deflection waveform signals that are controlled in amplitude and waveshape via data bus 951 and synchronized with the signal source selected for display. Exemplary green channel horizontal and vertical convergence coils 615 and 665 respectively, are driven by amplifiers 610 and 660 respectively, which are supplied with convergence correction waveform signals. The correction waveform signals GHC and GVC may be considered representative of DC and AC convergence signals, for example static and dynamic convergence respectively. However, these functional attributes may be facilitated as follows. An apparent static convergence or centering effect, for example, can be acheived by modifying all measurement location addresses by the same value or offset to move the complete raster. Similarly, a dynamic convergence effect may be produced by modification of the location address of a specific measurement location. Correction waveform signals GHC and GVC for the green channel are generated by exemplary digital to analog converters 311 and 312 which convert digital values read from memory 550 into deflection currents ihc and ivc respectively. Similarly, red and blue correction waveform signals are generated by digital to analog conversion of digital values read from memory 550.

An input display signal selector selects, by means of bus 951, between two signal sources IP1 and IP2, for example a broadcast video signal and an SVGA computer generated display signal. Video display signals RGB, are derived from the display video selector and electronically generated message information, for example; user control information, display setup and alignment signals and messages generated responsive to commands from controllers 301, 900 and 950, are coupled via buses 302 and 951, and may be combined by on screen display generator 500. During automated sensitivity calibration or convergence alignment, controller 900 sends commands via a data bus 302 to controller 301 which instructs video generator 310 to generate an exemplary green channel calibration video test signal AV comprising an exemplary black level signal with a rectangular block M having a predetermined video amplitude value. Controllers 900 and 301 also control the generation of block M to illuminate exemplary sensor S1 by determining horizontal and vertical timing to position block M within the scanned display raster. Alternatively, controllers 900 and 301 can move the scanned raster, or a part of the scanned raster containing the marker block M to achieve sensor lighting. Advantageously, both methods of marker motion control are employed to facilitate precision adjustment of the marker image relative to the sensor.

A green channel test signal AV is output from IC 300 and combined at amplifier 510 with the green channel output signal from on screen display generator 500. Thus, the output signal from amplifier 510 is coupled to exemplary green cathode ray tube GCRT, and may include display source video and or an OSD generated signal, for example a set up message, and or an IC 300 generated calibration video test signals AV.

Controller 301 also executes a program stored in program memory 308 which comprises various algorithms. To facilitate an initial setup adjustment, controller 301 outputs a digital word D on data bus 303, which is coupled to a controllable current source 250. The digital word D represents a specific current to be generated by current source 250 and supplied to sensors S1–8 and sensor detector 275.

To facilitate adjustment and alignment of the three color images, setup block M is generated as described previously and coupled to exemplary green CRT. In FIG. 1 an image of test pattern, block M is shown approaching photo transistor S1. As previously mentioned, each sensor may be illuminated by the marker block having a precise generated timing within a video signal projected with an overscanned raster. Alternatively the marker block may cause illumination by positioning, or shifting the scanned raster such that marker block M lights sensor S1, or with a combination of both. With certain display signal inputs, for example computer display format signals, substantially all of the scanned area can be utilized for signal display thus the raster is not overscanned. During operation with computer display format signals, raster overscan is limited to a nominal few percent, for example 1%. Hence under these substantially zero overscan conditions exemplary sensor S1 may be illuminated by raster positioning of block M. Clearly, individual sensor illumination may be facilitated with a combination of both video signal timing and raster positioning.

In each photo transistor, photon generated carriers enable transistor conduction in a substantially linear relationship to the intensity of the illumination incident thereon. However, the intensity of illumination at each individual sensor may vary greatly for a number of reasons, for example, the phosphor brightness of each individual CRT may be different, and there may be lens and optical path differences between the three monochromatic color images. As each CRT ages the phosphor brightness declines, furthermore with the passage of time, dust may accumulate within the optical projection path to reduce the intensity of illumination at the sensor. A further source of sensor current variability results from variations in sensitivity between individual sensors and their inherent spectral sensitivity. For example, in a silicon sensor, sensitivity is low for blue light and increases through the green and red spectrum to reach a maximum in the near infra red region. Thus, it may be appreciated that each individual sensor may conduct widely differing photo generated currents. Hence, to facilitate stable, repeatable measurements, it is essential that these sensor current variations are individually measured and a detection threshold set for each sensor and illuminating color. Thus, having determined the peak sensor current, which is directly proportional to the intensity of illumination, individual sensor detection threshold values may be stored to permit the subsequent detection of a lit or unlit sensor to occur at a consistent amplitude point of each sensor current.

With reference to FIG. 2, video generator 310 is instructed by control logic 301 to generate an exemplary green video block M having an initial non-peak video value and positioned on a substantially black or black level background. Similar video blocks with non-peak video values may be generated in each color channel, which when generated simultaneously and superimposed at the screen produce a white image block on a substantially black background. Thus, an exemplary green block M is generated by video generator 310 and coupled via amplifier 510 to the green CRT. The video generator 310 is controlled by the micro controller 301 to generate the green block M at a horizontal and vertical screen position such that a specific sensor, for example, sensor S1, is illuminated by green light from the image of block M. Illumination of the sensor results in photo generated charge PC, depicted in FIG. 4A, which results in photo transistor conduction of current Isen, shown in FIG. 2.

The widely differing photo generated sensor currents described previously are advantageously compensated, calibrated and measured by means of control loop 100 depicted in FIG. 2. Sensor detector 275 is depicted in circuit block 200 of FIG. 2. In simple terms, a reference current Iref is generated by a digitally controlled current source 250. The reference current is supplied to both exemplary photo transistor S1 and sensor detector 275. In the absence of illumination, photo transistor S1, represents a high impedance and consequently diverts an insignificant current, Isen, from reference current Iref. Thus the majority of reference current Iref, is coupled to sensor detector 275 as current Isw. Current Isw biases detector 275 such that the output state is low, which is chosen to represent an unlit or un-illuminated sensor. When photo transistor S1 is illuminated, photo generated charge PC causes the transistor to turn on and conduct current Isen from reference current Iref. Since the reference current is generated by a constant current source 250, sensor current Isen is diverted from sensor detector 275 current Isw. At a particular illumination level, photo transistor S1 diverts sufficient current from sensor detector 275 to cause it to switch off and assume a high, nominally supply voltage potential, which is chosen to be indicative of a lit or illuminated sensor. The output from sensor detector 275 is positive going pulse signal 202 which is a coupled to an input of digital convergence IC STV2050. The rising edge of pulse signal 202 is sampled which causes horizontal and vertical counters to stop thus providing counts which determine where in the measurement matrix the lit sensor occurred.

The photo transistor current is measured by controllably increasing reference current Iref until sensor detector 275 switches to indicate loss of sensor illumination. The value of reference current that caused detector 275 to indicate loss of sensor illumination is representative of the level of illumination incident on the sensor. Thus this current may be processed and stored as a sensor and color specific threshold value. The stored reference current value differs between sensors and from color to color, but detector switching is equalized to occur for illumination values reduced by approximately half of the measured Isen switching value.

Figure 3A:
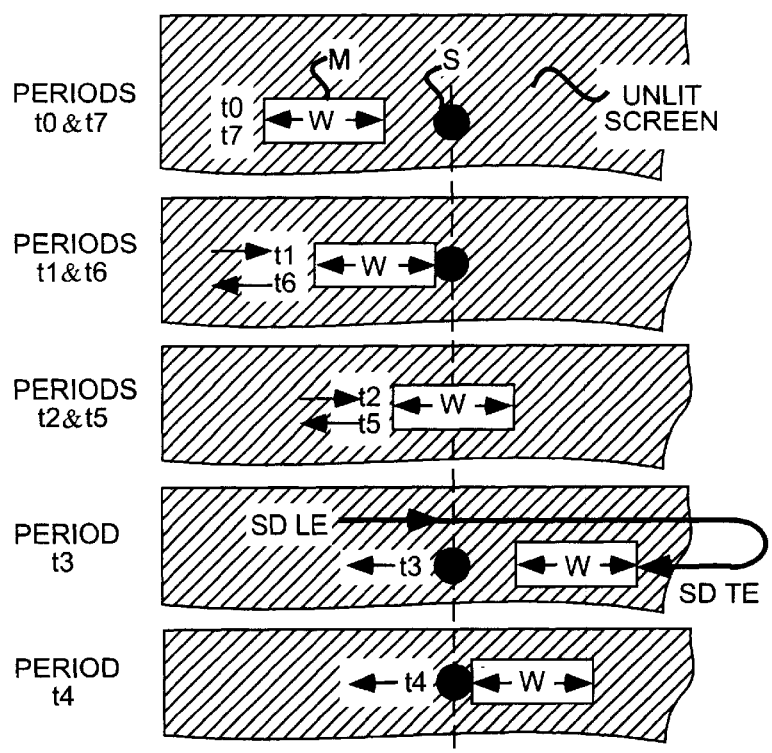
FIG. 3A depicts in detail, part of screen 700 of FIG. 1, and illustrates an inventive sensing sequence.

FIG. 3A depicts part of the display screen 700 of FIG. 1, in the vicinity of exemplary photo transistor sensor S1. The screen is illuminated with a projected measurement image formed by a signal which is largely black level with a monochrome measurement signal block M which has a significant video signal amplitude. Thus screen 700 is substantially black with a bright monochrome block M of duration W. The raster generating the projected image has a size such that exemplary photo transistor sensor S1 is within the projected image area.

In FIG. 3A the image of measurement block M is shown in various exemplary horizontal positions. A similar sequence of vertical positions can be employed for edge measurement in the vertical scan direction. Various block positions are illustrated representing different time periods, for example periods t0–t7. Although the exemplary horizontal block positions are depicted during a sequence of time periods, the actual block position, or image on the screen, is determined by controlled current steps applied to exemplary coils GHC or GVC of FIG. 2. The exemplary horizontal movement sequence is shown with reference to the fixed position of sensor S1 and is depicted at various time periods by repetition in the vertical drawing direction.

Figure 4A:
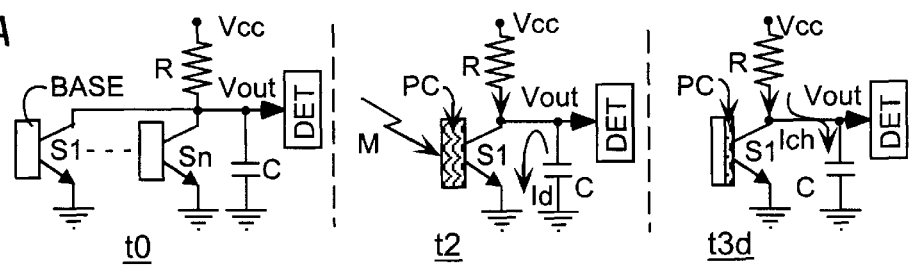
FIG. 4A is a simplified schematic drawing of a photo transistor sensor S1.
Figure 4B:
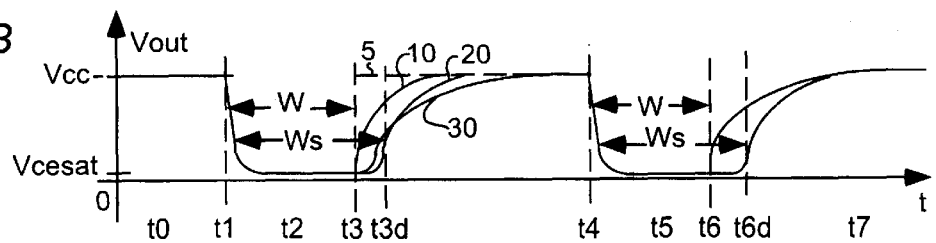
FIG. 4B illustrates the voltage waveform at the collector of photo transistor S1.

At time period t0, the image of measurement block M is located on the display screen such that sensor S1 is not illuminated by the bright monochrome image of block M. Thus, at time t0, photo transistor S1 is not illuminated, hence no photon generated base current is produced and photo transistor S1 is off. FIG. 4B shows the voltage waveform at the collector of photo transistor sensor S1 occurring at the various time periods. At time period t0, photo transistor S1 is non-conductive and FIG. 4B shows the sensor collector waveform voltage to be substantially equal to the supply voltage Vcc.

At time period t1 the image of block M is moved in a direction which causes the leading edge LE of the of image block M to illuminate sensor S1. The illuminating photons generate base current in the photo transistor S1 which causes the photo transistor S1 to become conductive. Some short time after period t1, the illumination has generated sufficient base charge to cause the photo transistor to be saturated. The saturated state is depicted in FIG. 4B at period t2, where the collector has a nominally voltage of zero volts or Vcesat.

The collector signal voltage Vout, from photo transistor S1 is coupled to a detector 275 which determines the presence or absence of marker block illumination. Both the leading or trailing edge position of the displayed image block are depicted relative to the fixed photo transistor S1. However, as shown in FIG. 4B, the collector voltage waveform Vout may, for a number of differing reasons, not accurately portray the duration and or intensity of the illuminating marker block image. During period t2 of FIG. 4B, the collector voltage occurring due to the leading edge of block M is depicted with a sloping, rounded falling edge to illustrate that establishing the saturated sensor state depends upon the intensity of the incident illumination. At time t3 and beyond, illumination of transistor S1 ceases because the image of block M has moved beyond the sensor and photo charge generation terminates in the photo transistor base. However, during period t3–t3d of FIG. 4B, the transistor collector potential remains low, indicating continued transistor conduction, for example, as a consequence of excess photo generated charge PC, or carriers remaining in the base region of the transistor. These photo generated carriers continue to sustain the conductive state of transistor S1, and only when dissipated will the transistor resume the off, or unlit condition. Thus it can be appreciated that the sustained sensor conduction following light termination at period t3–t3d will result in an erroneous measurement of block length Ws, if the leading and trailing edges of marker block are measured sequentially with unidirectional motion. The sensor response delay in returning to the unlit condition is obviated by an inventive sequence where the motion direction of measurement block M is reversed to permit the leading and trailing edges of block M to be measured by sensor S1 only when transitioning from an unlit to a lit condition. Thus by ensuring that measurements are performed as the sensor is illuminated eliminates erroneous measurement due to turn off delay. FIG. 4B depicts the slow rise time of the collector voltage waveform occurring during unlit period t3.

In FIG. 3A at period t3, the forward and reverse block motion for leading and trailing edge detection is depicted by the curved arrows where SD LE indicates the search direction for leading edge detection and arrow SD TE indicates the reversed direction for measurement of the trailing image edge. As described previously, by reversing the search direction, the trailing edge becomes the leading edge thus precise block measurement is achieved by ensuring that the measurement is performed only when the sensor transitions between unlit and lit conditions.

In FIG. 4B at time t5, the reverse direction leading edge of image block M starts to illuminate photo transistor S1 causing photo generated carriers PC to accumulate in the base region. These photo generated carriers turn on the photo transistor causing the collector potential to drop as depicted in period t5. At time t7 the trailing edge of the reverse motion image ceases to light photo transistor S1, and as previously described the transistor begins to turnoff. At some time after period t6d the sensor finally ceases conduction and at time t7 the image block is displaced from the sensor such that it is no longer lit.

The slow rise of the photo transistor collector voltage during turn off shown in FIG. 4B, may result from a number of different causes. For example, as described previously, excess photo generated charge in the photo transistor base region may sustain transistor conduction following the extinguishment of illumination. FIG. 4A, period t0, depicts a parallel configuration of photo transistors S1–Sn, in the absence of image block illumination with photo transistor base regions exaggerated and devoid of photo generated charge PC. At period t2 of FIG. 4A, image block M, depicted as a broken arrow, generates charge PC, shown by shading in the exaggerated base region of photo transistor S1. At period t3d of FIG. 4A, the image of block M is absent and photo generated charging ceases. However, photo generated charge PC, depicted by the shaded base region, remains and will sustain transistor conduction until dissipated. Thus the trailing edge TE of marker M is stretched and an erroneous duration Ws may be measured.

Another cause of slow collector voltage rise time results from capacitance C shown in FIG. 4A. The capacitance may result from a number of different sources, for example, the parallel connection of photo transistors S1–Sn results in the summation of both circuit and device parasitic capacitance. Furthermore any additional capacitance, for example, to reduce spurious signal pickup or provide low pass filtering of the photo transistor output signal will further slow the rate of collector voltage rise when transistor conduction ceases. In simple terms the photo transistor turn on may discharge capacitance C rapidly, but at transistor turnoff, charging current Ich is determined by the value of supply Vcc and resistor R.

Figure 3B:
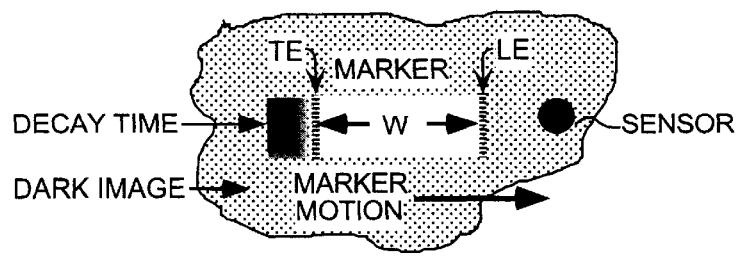
FIG. 3B depicts in greater detail, movement of marker M relative to photo transistor sensor S1.

A further source of poor trailing edge detection may result from CRT display phosphor persistence, decay time or after glow, following a lit to unlit image transition. Phosphor persistence is depicted in FIG. 3B by the graded shading following the trailing edge TE of the marker block image. To aid identification, the leading LE and trailing TE edges of the marker block image are depicted with horizontal shading. Phosphor persistence differs for different display colors, for example in a typical projection CRT, a blue phosphor may be described to have a short decay time, approximately in the order of 20 to 30 micro seconds. The green and red phosphor may be described as having a longer short decay time in the range of 1–2 mille seconds.

From the preceding descriptions of trailing edge image artifacts it can be deduced that determination of the cessation of marker illumination occurring at the trailing image edge may suffer distortion or delaying artifacts which erroneously increase detected block duration Ws. Such distortions are illustrated in FIG. 4B by the rising edges of exemplary collector voltage waveforms 10, 20 and 30. Collector voltage waveform 5 depicts an ideal, rapid rise of collector voltage. Clearly an inability to accurately sense marker block edges renders determination of the block duration, and thus marker center value invalid.

The consequence of slow sensor turn off and the slow rise in collector potential with light cessation may be advantageously precluded by sensing and detecting the marker trailing edge TE, with a reversed motion direction. In simple terms, the marker block motion is reversed relative to the sensor, thus the leading and trailing edges of the image block are also reversed. Hence, although the measurement of light cessation at the trailing edge remains ill-defined, by advantageously reversing the sensing direction, an accurate determination may be obtained for each edge of the marker block. Furthermore, inspection of FIGS. 3A and 4B indicates that accurate edge sensing is obtained when image edges cause the sensor to transition from an unlit to lit condition. Hence accurate edge measurements may be obtained at periods t1 and t5 of FIG. 3A, with the horizontal center of the marker image determined by calculation. For example the center of marker block can be determined from the average of the current values required to position the marker block at periods t1 and t5, the averaged block center being represented by [ihc(t1)+ihc(t5)]/2.

What is claimed is:

1. A method for determining a raster position in a video projection display apparatus comprising the steps of:

detecting illumination by a first edge of a measurement image moving in a first direction;

detecting illumination by a second edge of said measurement image moving in a second direction opposite said first direction; and, combining movement values related to said first and second edge illuminations of said detecting steps.

2. The method of claim 1, wherein said combining step further comprises determining a center of said measurement image with values from said step combining movement values.

3. The method of claim 1, wherein said respective detecting steps are responsive to said movement of said first and second edges in directions substantially parallel with a horizontal component of said raster.

4. The method of claim 1, wherein said respective detecting steps are responsive to said movement of said first and second edges moving in directions substantially orthogonal to a horizontal component of said raster.

5. The method of claim 1, comprising a further step of positioning a detector adjacent said raster for detecting said illumination by said edges.

6. A method for determining a raster position in a video projection display apparatus comprising the steps of:

moving an illuminating edge over said raster position; and, detecting only transitions at said raster position from non-illuminated to illuminated.

7. The method of claim 6, wherein said moving step further comprises, moving said illuminating edge over said raster position bi directionally.

8. The method of claim 6, wherein said detecting step further comprises the step of, averaging bi-directional movement values related to said detection at said raster position.

9. The method of claim 6, wherein said detecting step further comprises a step of, photo sensing said illumination transitions adjacent said rester position.

10. The method of claim 6, wherein said detecting step is responsive to said illuminating edge moving over said raster position in a direct on substantially parallel with a horizontal component of said raster.

11. A method for determining a raster position in a video projection display apparatus comprising the steps of:

detecting illumination by a first edge of a measurement image which transitions from non-illuminated to illuminated moving in a first direction;

detecting illumination by a second edge of said measurement image which transitions from non-illuminated to illuminated moving in a second direction; and, averaging movement values related to said first and second edge illuminations of said detecting steps.

* * * * *